(12) United States Patent
Vadersen

(10) Patent No.: US 8,251,241 B2
(45) Date of Patent: Aug. 28, 2012

(54) CONTAINER LID WITH CUTTING MECHANISM FOR ALLOWING EASY-OPEN ACCESS TO PRODUCTS IN SEALED CONTAINERS AND BEVERAGE CONTAINER INCLUDING CONTAINER LID

(75) Inventor: Erik S. Vadersen, Savannah, GA (US)

(73) Assignee: Profiscient Technology, Inc., Savannah, GA (US)

( * ) Notice: Subject to any disclaimer, the term of this patent is extended or adjusted under 35 U.S.C. 154(b) by 535 days.

(21) Appl. No.: 12/124,339

(22) Filed: May 21, 2008

(65) Prior Publication Data

US 2008/0290093 A1 Nov. 27, 2008

Related U.S. Application Data

(60) Provisional application No. 60/931,014, filed on May 21, 2007, provisional application No. 60/998,875, filed on Oct. 15, 2007.

(51) Int. Cl.
*B65D 17/30* (2006.01)
*B65D 17/42* (2006.01)
*B67D 1/00* (2006.01)

(52) U.S. Cl. ........... 220/267; 220/268; 220/277; 222/83

(58) Field of Classification Search ................. 220/277, 220/278, 267, 258.4, 258.5, 260; 222/83, 222/83.5, 541.2

See application file for complete search history.

(56) References Cited

U.S. PATENT DOCUMENTS

| | | | | |
|---|---|---|---|---|
| 3,347,410 | A * | 10/1967 | Schwartzman | 222/80 |
| 4,307,821 | A * | 12/1981 | McIntosh | 222/83 |
| 4,793,503 | A * | 12/1988 | Towns et al. | 215/250 |
| 4,869,399 | A * | 9/1989 | Dubach | 222/83 |
| 5,125,522 | A * | 6/1992 | Pezzoli et al. | 215/250 |
| 5,927,549 | A * | 7/1999 | Wood | 222/83 |
| 6,568,557 | B2 * | 5/2003 | Fusco et al. | 220/714 |
| 7,083,058 | B2 | 8/2006 | Perry et al. | |
| 2004/0149675 | A1 * | 8/2004 | Perry et al. | 215/228 |
| 2007/0181522 | A1 * | 8/2007 | Davidson | 215/228 |

FOREIGN PATENT DOCUMENTS

| | | |
|---|---|---|
| JP | 2000-326970 | 11/2000 |
| JP | 2002-225894 | 8/2002 |
| JP | 2007-084083 | 4/2007 |

\* cited by examiner

*Primary Examiner* — Anthony Stashick
*Assistant Examiner* — Brett Edwards
(74) *Attorney, Agent, or Firm* — Nixon & Vanderhye P.C.

(57) ABSTRACT

A lid facilitates opening a sealed container and includes a connecting rim engageable with the sealed container and encircling a lid surface, and threads disposed on an inside surface of the connecting rim. A cutting tab is disposed on the lid surface. The cutting tab is sized and positioned to engage a seal of the sealed container when the lid is threaded onto the sealed container via the threads. In one application, the lid is applied to a pre-filled container including a product sealed in the container. The lid serves to open the seal and provide access to the product.

16 Claims, 2 Drawing Sheets

CONTAINER LID WITH CUTTING MECHANISM FOR ALLOWING EASY-OPEN ACCESS TO PRODUCTS IN SEALED CONTAINERS AND BEVERAGE CONTAINER INCLUDING CONTAINER LID

CROSS-REFERENCES TO RELATED APPLICATIONS

This application claims the benefit of U.S. Provisional Patent Application Ser. No. 60/931,014, filed May 21, 2007, and U.S. Provisional Patent Application Ser. No. 60/998,875, filed Oct. 15, 2007, the contents of each of which are herein incorporated by reference.

STATEMENT REGARDING FEDERALLY SPONSORED RESEARCH OR DEVELOPMENT (NOT APPLICABLE)

BACKGROUND OF THE INVENTION

The invention relates to a cutting mechanism for use on threaded, twist-type lids allowing easy-open access to products in sealed containers. Additionally, the invention relates to a disposable children's "sippy" style beverage container including a container lid with a cutting mechanism to facilitate opening a sealed container.

No-spill beverage containers for children are widely known. Typically, the containers are formed of a molded plastic and include a screw-on container lid with a spout sized appropriately for a toddler's mouth. No-spill spouts are also known to prevent spilling even if the container is inverted. Typically, the lid is additionally provided with an air vent to avoid negative pressure build-up in the container and to make it easier for the child to drink.

These no-spill containers, so-called "sippy cups," are widely used, and it is not uncommon for parents to accumulate dozens of such cups. A drawback of these cups, however, is that when the child finishes the beverage in the container, refilling the container requires removing the container lid, pouring an additional beverage in the container, and re-attaching the container lid. This becomes more of a concern when traveling or being otherwise away from home.

Sealed beverage containers are also known. Such containers advantageously maintain the freshness of the drink and facilitate packaging. A drawback, however, is that in order to drink from the container, the consumer is required to remove the lid, manually remove or puncture the seal, then replace the lid for drinking.

BRIEF SUMMARY OF THE INVENTION

It would thus be desirable to provide a pre-filled, sealed beverage container, such as a sippy style container, including a lid that enables the seal to be selectively opened when ready for use. In an exemplary arrangement, the container is preferably a single-use, disposable sippy-style beverage container having a sealed liquid held in the cup body and a manually operated cutting mechanism built into the cup lid held above the sealing film/covering by a peel-away plastic lid extension. The cutting mechanism may alternatively be employed as a component to any round, threaded lid such as those typically employed in standard beverage containers including soda, juices, milk or other beverages. In addition, the cutting mechanism may be employed as a component to any round, threaded lid for any other type of container regardless of the contents of the container. The cutting mechanism is preferably molded into the lid at the time of lid manufacture. The lid equipped with the cutting mechanism is twisted downward, thereby engaging the cutting mechanism with the seal to displace/open the seal and enabling access to the product. The lid is applicable to any sealed, threaded container regardless of the type of sealing medium, i.e., heat or otherwise sealed foil, heat or otherwise sealed plastic, or metal.

In an exemplary embodiment, a lid facilitates opening a sealed container. The lid includes a connecting rim engageable with the sealed container and encircling a lid surface, and threads disposed on an inside surface of the connecting rim. A cutting tab is disposed on the lid surface. The cutting tab is sized and positioned to engage a seal of the sealed container when the lid is threaded onto the sealed container via the threads.

The lid may additionally include a peel-away extension disposed adjacent an end of the connecting rim. The peel-away extension is removable and effectively extends a depth of the lid. The peel-away extension is sized to prevent the cutting tab from coming in contact with the seal of the sealed container. The lid may still additionally include a stabilizing base disposed on the lid surface that engages the cutting tab. In this context, a circular internal rim may be disposed on the lid surface that is spaced from the connecting rim by an amount sufficient to receive a top rim of the container between the internal rim and the connecting rim. Preferably, the cutting tab is disposed on the lid surface between the stabilizing base and the internal rim. An air vent may be formed in the lid surface.

In a preferred arrangement, the connecting rim, the threads, and the cutting tab are molded in a one-piece assembly.

The lid may additionally include a drinking spout, such as a no-spill drinking spout defined in the lid surface.

The cutting tab may be rectangular or may embody other designs/shapes not limited to a straight cutting tab.

In another exemplary embodiment, a pre-filled container includes a container body having a top rim with external threads, the top rim defining a container opening. A product (such as a drinkable liquid, paint, peanut butter, etc.) is disposed in the container body, and a seal is disposed over the container opening that seals the product in the container body. The pre-filled product container additionally includes the lid of the described embodiments to facilitate opening the sealed container.

In yet another exemplary embodiment, a method of manufacturing a lid for opening a sealed container includes the steps of (a) forming a connecting rim engageable with the sealed container, the connecting rim encircling a lid surface; (b) providing threads on an inside surface of the connecting rim; and (c) forming a cutting tab on the lid surface, wherein the cutting tab is sized and positioned to engage a seal of the sealed container when the lid is threaded onto the sealed container via the threads. Preferably, steps (a)-(c) are practiced by molding the connecting rim, the threads, and the cutting tab in a one-piece assembly. In one arrangement, the lid is constructed of plastic, and the molding step comprises injection molding.

In still another exemplary embodiment, a method of opening a sealed container using an exemplary lid of the described embodiments includes the steps of removing the peel-away extension, and tightening the lid on the sealed container.

BRIEF DESCRIPTION OF THE DRAWINGS

These and other aspects and advantages will be described in detail with reference to the accompanying drawings, in which.

DETAILED DESCRIPTION OF THE INVENTION

Figure 1:
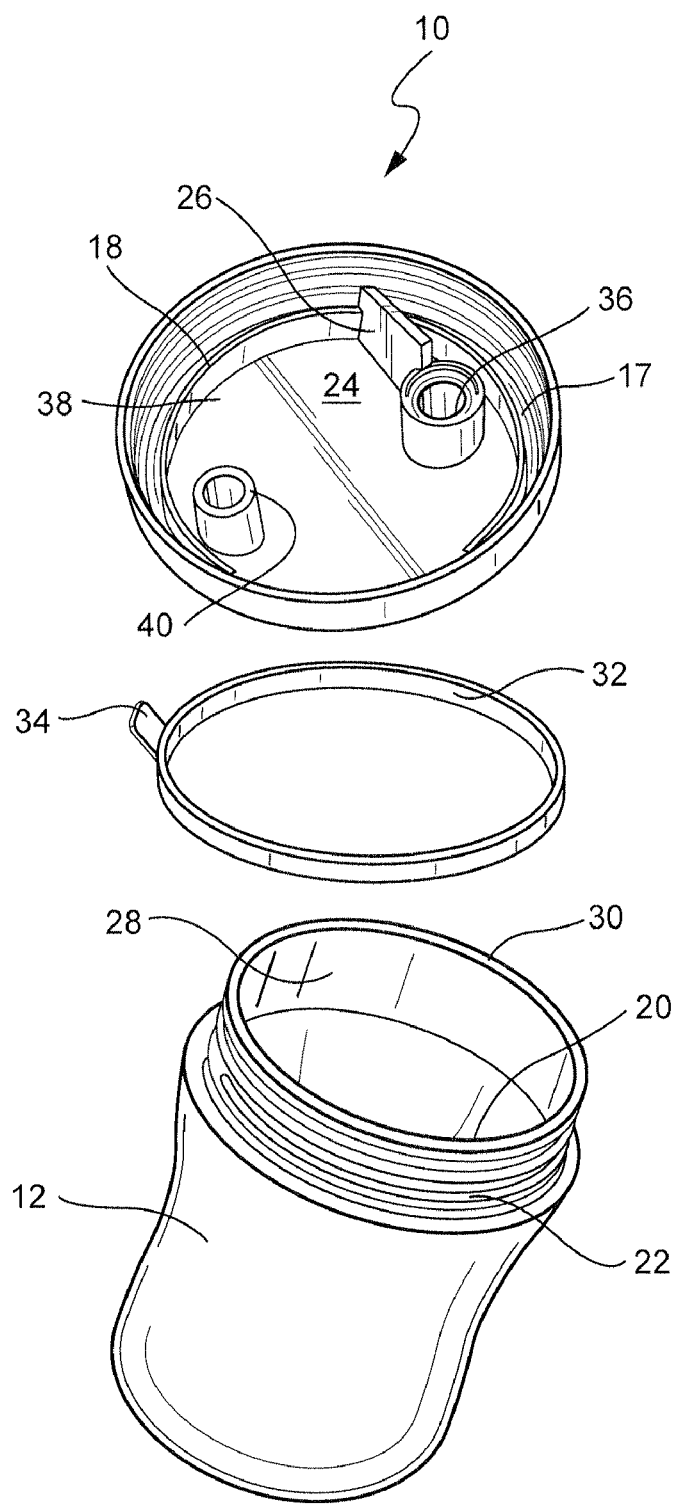
FIG. 1 is an exploded perspective view of the container showing an underside of the lid.
Figure 2:
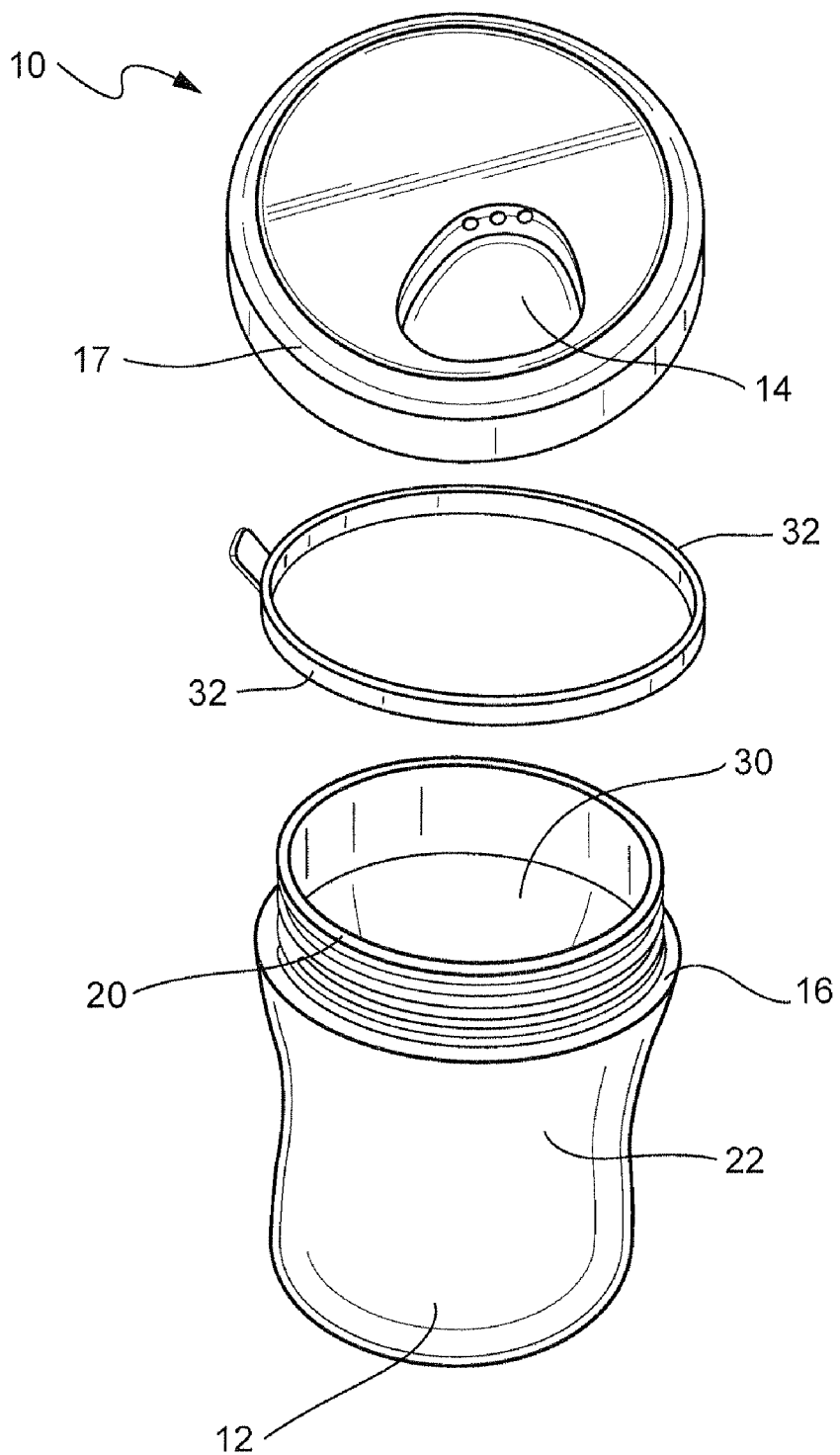
FIG. 2 is an exploded perspective view of the container.

FIGS. 1 and 2 are exploded perspective views of an exemplary children's sippy style beverage container. Generally, the container includes a lid 10 and a container body 12. Preferably, in the sippy cup embodiment, the lid 10 is provided with a no-spill drinking spout 14. The exterior of the lid 10 is preferably formed in the typical shape of a standard mass-marketed sippy cup lid. The no-spill drinking spout 14 may be any suitable known construction but preferably is a molded, tubular silicon component with one end open and the other end closed with a thin-silicon membrane having an "X" shaped incision to allow spill-proof drinking through the sip-style spout 14. The silicon sip valve is inserted into a tubular cavity directly below the sip-style spout 14. The drinking spout 14 may alternatively be a spill-resistant spout or some other type of spout of known construction.

A cup body 12 shown is a typical sippy-style cup body preferably including a slightly extending ridge 16. The diameter of the exemplary cup body 12 at the opening for the sippy cup application is about three inches. Of course, the lid structure structure is applicable to any size container.

The lid 10 is provided with a connecting rim 17 including internal threads 18, and a top rim 20 of the container body 12 is provided with external threads 22. The lid 10 is securable to the container body 12 via threads 18, 22. Such threads 18, 22 are additionally typically found on standard, mass-marketed sippy cups.

With continued reference to FIG. 1, the connecting ring 17 encircles or delimits a lid surface 24. A cutting mechanism or tab 26 is disposed on the lid surface 24. As shown, the cutting tab 26 is generally rectangular shaped, although those of ordinary skill in the art will appreciate that other shapes may be suitable, and the invention is not meant to be limited to the illustrated shape. The size and shape of the cutting tab 26 and the length and width of each of its sides similarly can vary depending on the size of the lid or the strength of the sealing medium to be opened. The cutting tab 26 is sized and positioned to engage a seal 28 disposed over the container body opening 30 defined by the top rim 20 when the lid 12 is threaded onto the container body top rim 20 via the threads 18, 22. In addition, the cutting tab 26 may be molded at a specific, undefined angle to allow the sealing medium to be cut and moved in a particular manner while attached to the lid surface 24, stabilizing base 36 and inside rim 38.

A peel-away extension 32 is disposed adjacent an end of the connecting rim 17 (see FIG. 2 in particular). The peel-away extension 32 is readily removable and effectively extends a depth of the lid 10 (i.e., serving as an extension of the connecting rim 17). The peel-away extension 32 is sized to prevent the cutting tab 26 from coming in contact with the seal 28 of the container body 12. The peel-away extension 32 includes, for example, a pull tab 34 to facilitate removal. This extension 32 is similar to the peel-away mechanism on a container of milk or the like. Of course, the peel-away extension 32 can vary in size, thickness and width based on the size of the container, the length of the threads, and the desired distance to maintain the cutting tab 26 from the seal 28 prior to use.

A stabilizing base 36 may be disposed on the lid surface 24 and preferably surrounds the tubular cavity directly below the sip-style spout 14, although alternative locations on the lid surface may be used. The stabilizing base may be formed in any suitable shape and is preferably cylindrical shaped. The cutting tab 26 preferably engages the stabilizing base 36, and the stabilizing base 36 thus serves to provide added support for the cutting tab 26. The stabilizing base 36 can be of any shape or design and preferably includes one edge or wall that extends wider than the thickness of the edge of the cutting tab.

The lid 10 may additionally include a circular internal rim 38 disposed on the lid surface 24 and spaced from the connecting rim 17 by an amount sufficient to receive the top rim 20 of the container body 12 between the internal rim 38 and the connecting rim 17. The rim 38 is thus smaller than the diameter of the lid 10 allowing ample space for the threads 22 of the container body 12 to fit between the rim 38 and the threads 18 on the lid 10. The rim 38 can be of any diameter and/or thickness depending on the size of the lid 10, the size and shape of the threads 18, 22, or the size of the opening necessary in the sealing medium 28. Additionally, the threads 18, 22 may be any size, shape or slope (angle of the threads), to allow a desired distance between the bottom of the cutting tab 26 and the sealing medium 28. As shown in FIG. 1, the cutting tab 26 is preferably disposed on the lid surface 24 between the stabilizing base 36 and the internal rim 38.

Like the conventional sippy cup lids, the lid 10 may additionally include an air vent 40.

Preferably, all of the lid components are molded in a one-piece assembly.

In manufacturing the lid 10, the rim 38 is molded (through an injection molding or casting process) as a component of the lid 10 and is centered on the underside of the lid 10 leaving ample space for the threads 22 on the receiving container 12 between the outer side of the rim 38 and the connecting rim 17 of the lid 10. For the sake of description, the rim 38 can be described like a clock with 12:00 being at the top and 6:00 being at the bottom. The stabilizing base 36 is molded (through an injection molding or casting process) as a component of the lid 10 and is preferably placed between 6:00 and 12:00 inside the rim 38 with one edge touching, or close to the inside edge of the rim 38 and the other edge projecting downward towards the center of the clock. The cutting tab 26 is molded (through an injection molding process) as a component of the lid 10 and is preferably located between 6:00 and 12:00 as shown. In FIG. 1, the cutting tab 26 is located between 11:00 and 12:00. The peel-away extension 32 is molded (through an injection molding or casting process) as a component of the lid 10 and is attached to the bottom edge of the lid 10 in a manner that allows it to be easily pealed away (similar to a milk container, i.e., using a scored or thinned connection or the like).

The lid 10 including the described cutting mechanism provides the ability for the lid 10 to be applied to a container on a standard production line. Additionally, the lid provides the ability to easily and efficiently access the contents of the sealed container without the need to remove the lid and manually remove the sealing medium. Although the lid has been described in conjunction with its exemplary use with a sippy cup, those of ordinary skill in the art will appreciate multiple additional applications for opening a sealed container. For example, many adult sport drinks are marketed with container lids including a drinking spout. The described container lid could be readily incorporated into such products. In addition, any sealed product, not limited to drinkable beverages, can be enclosed in any round-mouthed container and accessed by the lid with the cutting mechanism, i.e. paint, peanut butter, butter, chemicals, infant formula, nuts, fruits and vegetables, etc. Contents of the sealed container are only limited by the product's ability to be sealed with a sealing medium such as foil, paper, chemically additive paper, metal or other sealing media that are penetrable by the cutting tab and appropriate for use with the specific product.

In applying the lid with the integrated cutting mechanism into a container on a standard production line, the cutting mechanism as a molded part of the lid could be nested in a standard cylindrical tube format typically used on product filling or capping lines. Lids are applied pneumatically or mechanically into the capping mechanism and tightened to the point where the peel-away extension prevents the lid from being tightened further. In manufacturing/filling the cup body with beverage, a beverage filling machine can be calibrated to accept the diameter and shape of the cup body and fill the cup body to the appropriate level of beverage. The sealing mechanism of the beverage machine is calibrated to mechanically seal the cup body after filling. The empty cup bodies are staged into the machine, and the machine is activated. When applicable, depending on the machine used, the lid attachment mechanism is calibrated to fit the contours and diameter of the lid. Lids are staged into the machine and attached as a part of the filling process. In some instances, lids may have to be attached manually depending on the availability and functionality of the lid attachment mechanism on a given beverage filling machine. In the case of manual attachment, lids are screwed onto the threads to the point of stopping in response to the peel-away plastic lid extension reaching the extended ridge on the exterior of the cup body.

In use, the container sealed with the lid is taken in one hand, while the peel-away plastic extension is removed with the other hand (similar to the opening process on the container of milk). The lid is then tightened on the container (typically by twisting clockwise) as if applying the lid until the lid will twist no further (the exact number/percentage of rotation(s) can be variable depending on the size of the opening required for the product, the type of sealing medium, or the amount of sealing medium to be removed). With the beverage container, the cutting mechanism safely pierces the film/covering over the beverage allowing the liquid to flow freely in response to sucking through the drinking spout. The shape of the cutting mechanism ensures that no pieces or particles of the film/covering are created that can be imbibed while drinking the beverage from a pre-filled container. In alternative applications, after opening the seal, the lid can be loosened (typically by rotating counterclockwise) until removed providing access to the product with the sealing medium punctured, removed or pushed to the side, depending on the product requirements and specific engineering on the cutting mechanism.

The lid and container assembly is particularly suited for use in combination as a pre-filled sippy cup preferably formed of a disposable material. The assembly provides the ability for the cup body to be filled with liquid and sealed on a standard beverage filling machine and, when necessary, blow molded, filled and sealed on a standard molding beverage filling machine. The combination provides the ability for the child, or the child's guardian, to access and drink the sealed liquid without having to remove the top. Moreover, the combination provides the ability to pre-package, easily transport, and easily stage the product for sale as a pre-filled beverage for children.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A lid for opening a sealed container, the lid comprising:
   a connecting rim engageable with the sealed container and encircling a lid surface;
   threads disposed on an inside surface of the connecting rim;
   a drinking spout disposed offset from a center of the lid surface;
   a stabilizing base disposed on the lid surface surrounding the drinking spout;
   a circular internal rim disposed on the lid surface, the internal rim being spaced from the connecting rim by an amount sufficient to receive a top rim of the container between the internal rim and the connecting rim; and
   a cutting tab disposed on the lid surface, wherein the cutting tab is engaged with the stabilizing base and extends between the stabilizing base and the circular internal rim, wherein a radial distance from the center of the lid surface to the cutting tab in a plane of the lid surface varies along a length of the cutting tab such that the cutting tab is displaced across a cutting path to engage and displace a seal of the sealed container when the lid is threaded onto the sealed container via the threads.

2. A lid according to claim 1, further comprising a peel-away extension disposed adjacent an end of the connecting rim, the peel-away extension being removable and effectively extending a depth of the lid, wherein the peel-away extension is sized to prevent the cutting tab from coming in contact with the seal of the sealed container.

3. A lid according to claim 1, further comprising an air vent formed in the lid surface.

4. A lid according to claim 1, wherein the connecting rim, the threads, and the cutting tab are molded in a one-piece assembly.

5. A lid according to claim 1, wherein the drinking spout is a no-spill drinking spout.

6. A lid according to claim 1, wherein the cutting tab is rectangular.

7. A lid according to claim 1, wherein the cutting tab extends from a position adjacent the drinking spout and a first radial distance from the center of the lid surface toward the connecting rim a second radial distance from the center of the lid surface.

8. A lid according to claim 7, wherein the second radial distance is greater than the first radial distance.

9. A method of opening a sealed container using the lid of claim 2, the method comprising removing the peel-away extension, and tightening the lid on the sealed container.

10. A pre-filled container comprising:
    a container body having a top rim with external threads, the top rim defining a container opening;
    a product disposed in the container body;
    a seal disposed over the container opening and sealing the product in the container body; and
    a lid engageable with the top rim, wherein the lid comprises:
       a connecting rim engageable with the top rim and encircling a lid surface,
       threads disposed on an inside surface of the connecting rim,
       a drinking spout disposed offset from a center of the lid surface,
       a stabilizing base disposed on the lid surface surrounding the drinking spout, a circular internal rim disposed on the lid surface, the internal rim being spaced from the connecting rim by an amount sufficient to receive a top rim of the container between the internal rim and the connecting rim, and a cutting tab disposed on the lid surface, wherein the cutting tab is engaged with the stabilizing base and extends between the stabilizing base and the circular internal rim, wherein a radial distance from the center of the lid surface to the cutting tab in a plane of the lid surface varies along a length of the cutting tab such that the cutting tab is displaced across a cutting path to engage and displace the seal of the container body when the lid is threaded onto the container body top rim via the threads.

11. A pre-filled container according to claim 10, wherein the lid further comprises a peel-away extension disposed adjacent an end of the connecting rim, the peel-away extension being removable and effectively extending a depth of the lid, wherein the peel-away extension is sized to prevent the cutting tab from coming in contact with the seal of the container body.

12. A prefilled container according to claim 10, wherein the cutting tab is positioned to create an opening in the seal through which the product can be dispensed through the lid when the lid is threaded onto the container body top rim via the threads.

13. A pre-filled container according to claim 10, wherein the drinking spout is a no-spill drinking spout.

14. A method of manufacturing a lid for opening a sealed container, the method comprising:
    (a) forming a connecting rim engageable with the sealed container, the connecting rim encircling a lid surface;
    (b) providing threads on an inside surface of the connecting rim;
    (c) forming a drinking spout positioned offset from a center of the lid surface;
    (d) forming a stabilizing base on the lid surface surrounding the drinking spout;
    (e) disposing a circular internal rim on the lid surface, the internal rim being spaced from the connecting rim by an amount sufficient to receive a top rim of the container between the internal rim and the connecting rim; and
    (f) forming a cutting tab on the lid surface in engagement with the stabilizing base and extending between the stabilizing base and the circular internal rim, the forming step being practiced such that a radial distance from the center of the lid surface to the cutting tab in a plane of the lid surface varies along a length of the cutting tab and such that the cutting tab is displaced across a cutting path to engage and displace a seal of the sealed container when the lid is threaded onto the sealed container via the threads.

15. A method according to claim 14, wherein steps (a)-(e) are practiced by molding the connecting rim, the threads, the drinking spout, the stabilizing base, and the cutting tab in a one-piece assembly.

16. A method according to claim 15, wherein the lid is constructed of plastic, and wherein the molding step comprises injection molding.

* * * * *